(12) United States Patent
Annadore et al.

(10) Patent No.: US 8,456,774 B1
(45) Date of Patent: Jun. 4, 2013

(54) COMPENSATING ASYMMETRIES OF SIGNALS USING PIECE-WISE LINEAR APPROXIMATION

(75) Inventors: Sriharsha Annadore, San Jose, CA (US); Mahendra Singh, Gurgaon (IN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/453,584

(22) Filed: Apr. 23, 2012

Related U.S. Application Data

(63) Continuation of application No. 11/835,936, filed on Aug. 8, 2007, now Pat. No. 8,164,845.

(51) Int. Cl.
*G11B 5/02* (2006.01)

(52) U.S. Cl.
USPC ........... 360/25; 360/46; 360/65; 360/67; 360/68

(58) Field of Classification Search
None
See application file for complete search history.

(56) References Cited

U.S. PATENT DOCUMENTS

| | | | |
|---|---|---|---|
| 5,175,621 A | 12/1992 | Maesato | |
| 5,684,650 A | 11/1997 | Kadlec et al. | |
| 5,744,993 A * | 4/1998 | Sonntag | 327/307 |
| 6,043,943 A | 3/2000 | Rezzi et al. | |
| 6,147,828 A * | 11/2000 | Bloodworth et al. | 360/65 |
| 6,166,781 A | 12/2000 | Kwak et al. | |
| 6,400,518 B1 | 6/2002 | Bhaumik et al. | |
| 6,529,340 B2 * | 3/2003 | Gowda et al. | 360/25 |
| 6,545,535 B2 * | 4/2003 | Andre | 330/149 |
| 6,573,934 B1 * | 6/2003 | Lee | 348/254 |
| 6,587,292 B1 | 7/2003 | Ashley et al. | |
| 6,594,094 B2 | 7/2003 | Rae et al. | |
| 6,633,447 B2 * | 10/2003 | Franck et al. | 360/67 |
| 7,012,772 B1 | 3/2006 | Vis | |
| 7,079,342 B1 * | 7/2006 | Han et al. | 360/46 |
| 7,106,551 B2 | 9/2006 | Chung | |
| 7,203,013 B1 * | 4/2007 | Han et al. | 360/46 |
| 7,382,416 B2 * | 6/2008 | Mizusaki | 348/674 |
| 7,382,561 B1 * | 6/2008 | Hung | 360/46 |
| 7,495,854 B2 * | 2/2009 | Hutchins et al. | 360/46 |
| 7,929,240 B2 | 4/2011 | Mathew et al. | |
| 2003/0160901 A1 * | 8/2003 | Topper | 348/674 |
| 2005/0114134 A1 | 5/2005 | Deng et al. | |
| 2005/0219729 A1 | 10/2005 | Franck | |

* cited by examiner

*Primary Examiner* — Dismery Mercedes

(57) ABSTRACT

A system including a first circuit and a second circuit. The first circuit is configured to (i) select a first portion of a signal based on a first offset, (ii) amplify the first portion of the signal according to a first function, and (iii) scale the amplified first portion based on a first factor to generate a first compensation for asymmetry in the first portion of the signal. The second circuit is configured to (i) select a second portion of the signal based on a second offset, (ii) amplify the second portion according to a second function, and (iii) scale the amplified second portion based on a second factor to generate a second compensation for asymmetry in the second portion of the signal.

12 Claims, 7 Drawing Sheets

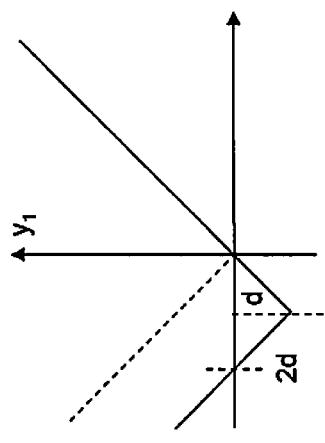
FIG. 5b
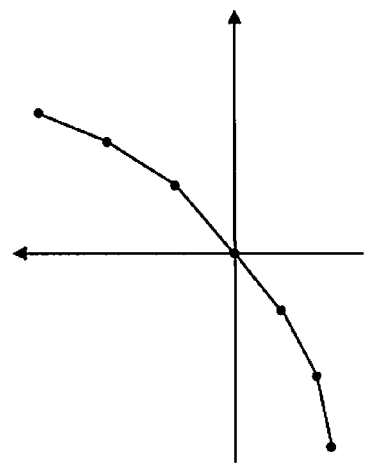
FIG. 7
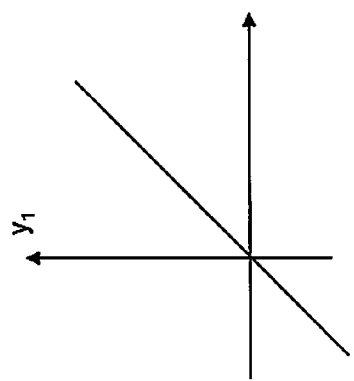
FIG. 5a
FIG. 5c

COMPENSATING ASYMMETRIES OF SIGNALS USING PIECE-WISE LINEAR APPROXIMATION

CROSS-REFERENCE TO RELATED APPLICATIONS

This application is a continuation of U.S. patent application Ser. No. 11/835,936 filed on Aug. 8, 2007. The disclosure of the above application is incorporated herein by reference in its entirety.

BACKGROUND

Hard disk drive transducing heads, including magneto-resistive (MR) heads, can provide an asymmetric output for a variety of reasons well known to ordinarily skilled artisans. Such reasons include, but are not limited to age, temperature, thermal asperity, current changes, and the like. When an output is asymmetric, the output waveform, desirably substantially sinusoidal, can have a positive portion of the waveform that is more substantial than a negative portion thereof (or vice versa).

Various asymmetry correction approaches have been tried over the years, including providing second order and/or third order corrections, or exponential corrections, or corrections which include a modulus function. One deficiency in these approaches is their validity extends only within a relatively limited range of unsaturated states of the head. Outside of that limited range, the results tend to diverge, and are less desirable.

FIGS. 1a-1c are sample saturation curves that are plots of resistance as a function of magnetic flux. There is a portion of these curves, in the vicinity of a value $I_{bias}$, that is substantially linear. Heading in either direction on these curves away from the value $I_{bias}$, the curves have nonlinear characteristics that can be modeled in different ways. The areas on these curves outside of the outermost circles correspond to saturated states. In FIG. 1a, the area around $I_{bias}$ is modeled using a purely linear function such as $y=\alpha x$. As can be seen in FIG. 1a, the linear approximation works in a portion, but not in all of the unsaturated region.

FIG. 1b shows the same curve, this time with a model based on an exponential or second/third order function such as $y=\alpha x^n$. Again, while the model holds through part of the unsaturated region, it does not hold throughout. Finally, FIG. 1c shows the same curve again, this time with a model based on a modulus function such as $y=\alpha|x|+x$, where a dark dot shows a change (break point) in the slope of the line based on the modulus function. As can be seen, once again, while this model holds through part of the unsaturated region, it does not hold throughout.

In view of this and other deficiencies, it would be desirable to have an asymmetry correction system which provides a valuable approximation to an appropriate asymmetry correction over a wider range.

BRIEF DESCRIPTION OF DRAWINGS

The invention now will be described in detail with reference to one or more embodiments and also with reference to the following drawings, in which:

FIGS. 5a-5c are graphs describing an output of the circuit of FIG. 4;

FIG. 7 is a graph of one possible output of the circuit of FIG. 6; and

DESCRIPTION

To achieve the foregoing and other objects, in accordance with one embodiment of the invention, a piece-wise linear approximation to an asymmetry correction curve is provided, in which the number of pieces is selectable, and the type of correction (e.g. linear, exponential, higher-order, modulus) provided for each of the pieces also is selectable.

Objects and advantages of the present invention will become apparent from the following detailed description. For convenience, the following description refers to MR heads, but the invention is applicable to any apparatus in which asymmetry correction is necessary.

Figure 1A:
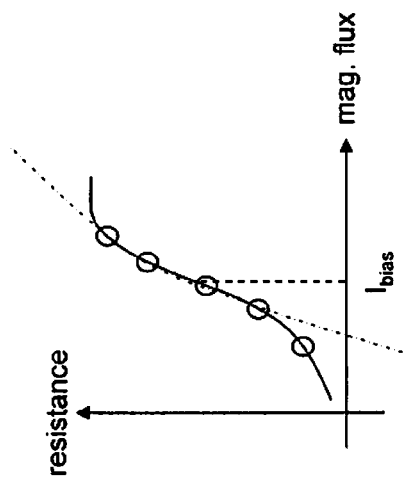
FIGS. 1a-1c depict various aspects of graphs of asymmetry correction.
Figure 1C:
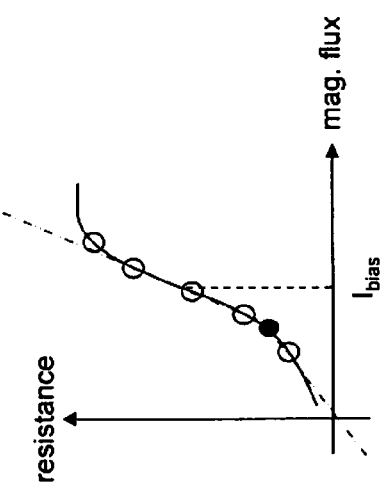
Figure 1B:
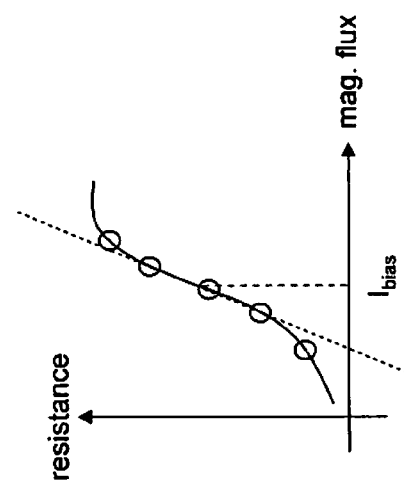
Figure 2:
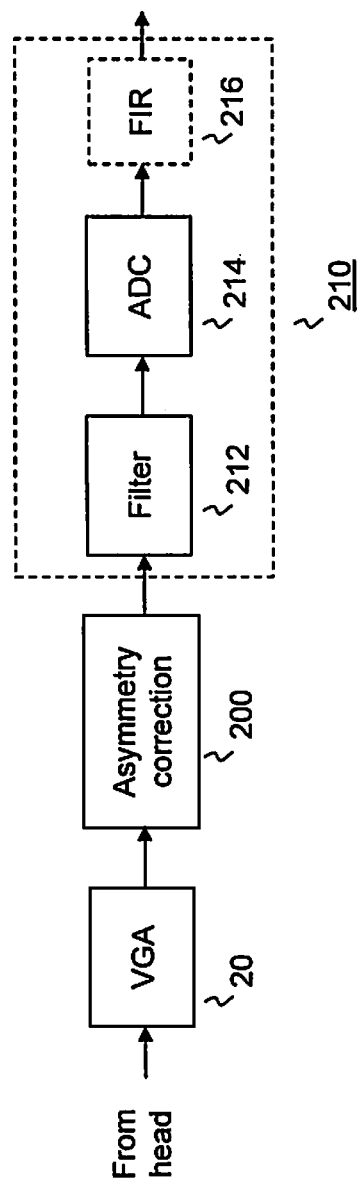
FIG. 2 is a high-level block diagram of a portion of a read channel according to one embodiment of the present invention.

Referring to FIG. 2, the signals from an MR head pass to variable gain amplifier (VGA) 20, and then to an asymmetry correction block 200. The output of that correction block 200 is filtered and provided to a processing block 210. The processing block 210 includes a filter 212, an analog-to-digital converter (ADC) 214, and a further filter such as a finite impulse response (FIR) filter 216. Skilled artisans will appreciate that the processing block 210 can have numerous variants, including but not limited to the number and types of filters contained therein.

Figure 3B:
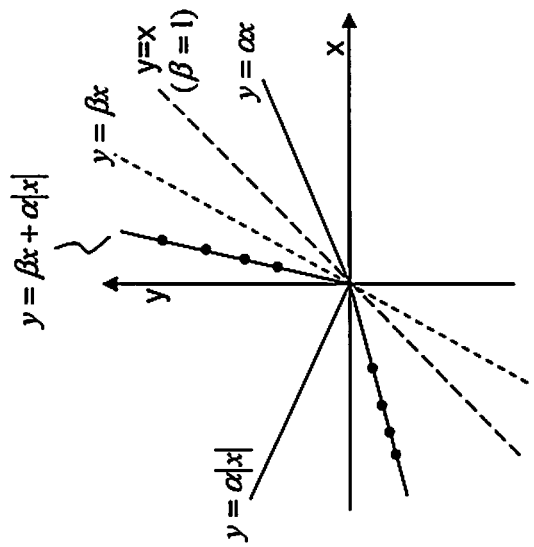
FIGS. 3a and 3b are a block diagram of one portion of an asymmetry correction circuit according to one embodiment of the invention, and a graph depicting the output of that circuit respectively.
Figure 3A:
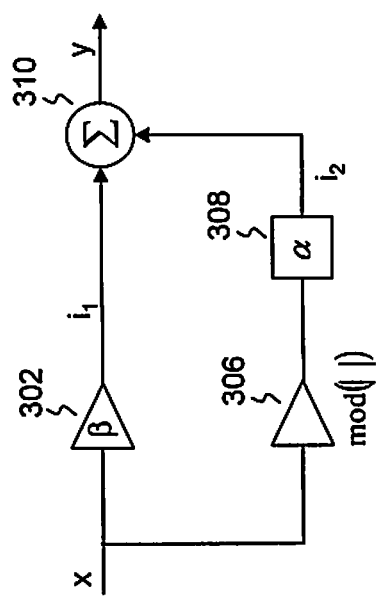

FIG. 3a is a diagram of one embodiment of circuitry for implementing the function $y=\alpha|x|+x$. As can be seen in FIG. 3a, the value for x is provided to an amplifier 302 which in one embodiment has a gain of 1, but which in other embodiments can have various gain values as desired. The output $i_1$ from that amplifier 302 is provided to a summer 310. The value for x also goes into an amplifier 306 that provides a modulus or absolute value of x. The output of that amplifier 306 is multiplied in a block 308 by a scaling factor of a which is selectable according to the correction to be provided. The output $i_2$ from that a block 308 also is passed to the summer 310, and the output of the summer 310 is the desired function y.

FIG. 3b shows the graph of $y=\beta x+\alpha|x|$. Also shown is a dotted line $y=\beta x$, where $\beta$ is the value of the gain of the amplifier in FIG. 3a. $\alpha|x|$ is shown as well. The solid line with large dots shows the actual value of $y=\beta x+\alpha|x|$, where $\alpha|x|$ is always greater than or equal to 0.

Figure 4:
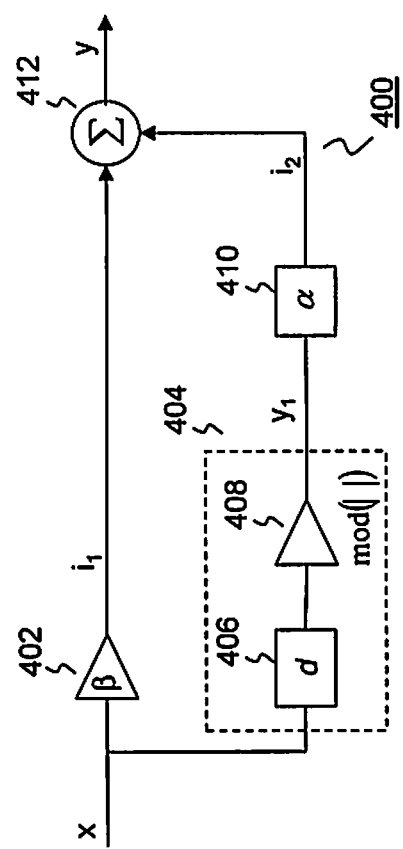
FIG. 4 is a block diagram of another embodiment of one portion of an asymmetry correction circuit according to the present invention.

FIG. 4 shows a block similar to FIG. 3a, except that a value which is an offset of d is added going into the amplifier 306 that provides the modulus of x. The dotted line around the offset block 406 and the amplifier 408 identify circuitry, the output of which is function of x and d. d may be 0, or a positive value, or a negative value, depending on the portion of the curve in FIG. 3a for which compensation, or piece-wise linear approximation is being provided. d simply shifts the compensation graph to the left or right, depending on the position of interest on the saturation curve relative to the origin.

In FIG. 4, the input x goes into an amplifier 402 where it is amplified by a factor of β, where β can be 1 in one embodiment, or different from 1 in other embodiments. The output of that amplifier 402, $i_1$ goes to a summer 412, similarly to the case in FIG. 3a.

The value x also goes into a correction block 404 which includes an offset block 406, as noted previously, and a modulus amplifier 408. The output of that modulus amplifier 408, $y_1$, is scaled by a scaler 410 with a factor α, and the output $i_2$, also passes through the summer 412 to yield the result y.

FIG. 5a and FIG. 5b show respectively graphs of current as a function of the input voltage, and also show a graph of a resulting modulus function based on an offset d which, to accomplish the graph in FIG. 5b, is negative. As shown in FIG. 5c, to the left of the offset value d, the slope of the line changes. If the offset d had been positive rather than negative, the slope in the upper right quadrant would have changed, per the dotted line, rather than changing in the lower left quadrant, as shown in FIG. 5c. If d had been zero, the graph would have been symmetric around the Y axis.

Figure 6:
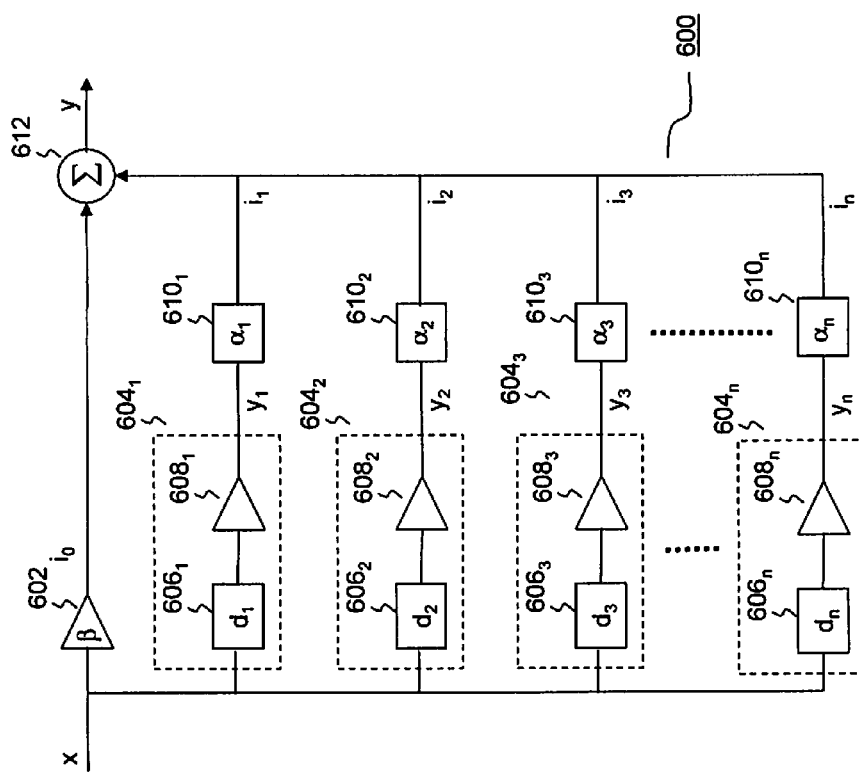
FIG. 6 is a block diagram of another embodiment of the invention.

FIG. 6 shows an embodiment of the invention which accomplishes multiple breaks, to provide multiple piece-wise linear approximations. Since a second order compensation, or a third order compensation, or both, or compensations of other orders, or modulus compensation may be necessary at different parts of the curve, the provision of multiple break points enables local tuning of the compensation curve in order to provide accurate compensation. In FIG. 6, the input x goes into an amplifier 602 where it is amplified by a gain of) β (which in one embodiment is 1) and the output is passed to a summer 612. The input x also passes into a block $604_1$ where an offset $d_1$ is provided in block $606_1$, the output of that block $606_1$ going to a modulus amplifier $608_1$. The output $i_1$ of that amplifier $608_1$ is scaled by a scalar $610_1$ with a factor $α_1$ and the output, $i_1$, passes to the summer 612. Also shown, in the same manner as for the offset $d_1$, there is a block line for providing an offset $d_2$, and below that, the provision of an offset $d_3$. Each of the amplifiers $608_1$ may be modulus amplifiers, or exponential-order amplifiers, or any desired combination of these, depending on the amount or type of control that the user wants or needs over the asymmetry correction process.

As many breakpoints, or as few breakpoints as desired (a number N are shown in FIG. 6) may be provided. The summer 612 thus sums all of the currents $i_0$ through $i_n$, and the resulting output y may be represented by the following equation:

$$y = x + \sum_{i=1}^{n} \alpha_i f_i(x, d_i)$$

For each of the individual blocks providing offsets $d_1$, $d_2$, $d_n$, y=f(x,d). The following relationships pertain:

$$\left.\begin{array}{l} y_1 = x, x > d \\ y_1 = -(x + 2d), x \le d \end{array}\right\} d < 0$$

$$\left.\begin{array}{l} y_1 = x - 2d, x \ge d \\ y_1 = -x, x < d \end{array}\right\} d \ge 0$$

One advantage of the arrangement of FIG. 6 is that the combination of the various blocks is linear. Thus, for example, where an overall scaling of α might be desirable, α can be split into smaller blocks. The corresponding transistors for those blocks can be smaller. As a result, in one embodiment, the same amount of real estate on a wafer can be used for the overall α as for the combination of the various smaller α. The difference is that the channel designer is provided with more variables, thus providing more control and more precise curve fitting.

One result of the embodiment of FIG. 6 is shown in the graph of FIG. 7, which is a curve with a number of segments.

As can be appreciated from the foregoing, the amount of complexity of the overall circuit is a linear function of the number of breakpoints desired. For example, providing four breakpoints would result in roughly four times the complexity of an implementation with a single breakpoint.

Figure 8:
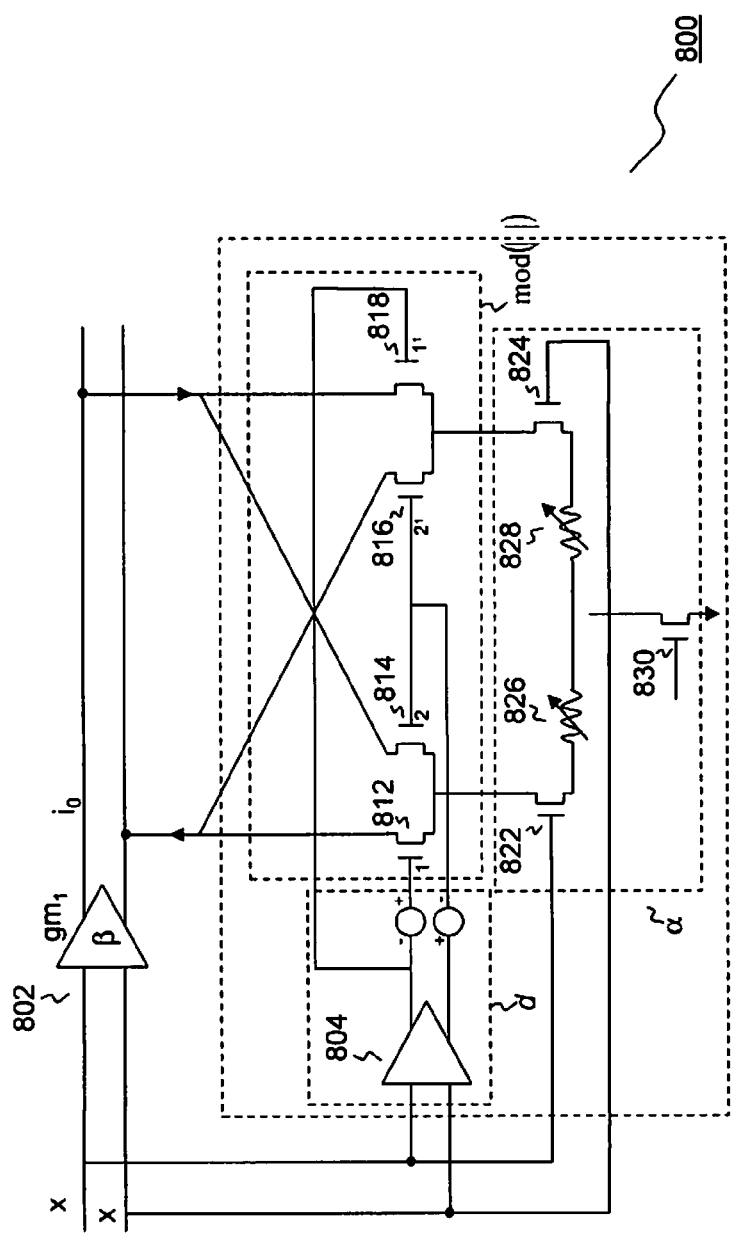
FIG. 8 is a more detailed circuit diagram of one portion of an asymmetry correction circuit according to one embodiment of the present invention as used for example, in FIG. 4.

FIG. 8 shows a transistor level version of one embodiment of one of the cells for a particular breakpoint of FIG. 6, using modulus function implementation, as shown for example in FIG. 4. In FIG. 8, the input voltage x is provided to an amplifier 802, which provides a gain of β, as described before. x also is provided to the two inputs of a switching amplifier 804 which switches direction according to a desired zero crossing (d). One output of the switching amplifier 804 is provided to transistors 812, 818, and the other output is provided to transistors 814, 816. When transistors 812, 818 are on, transistors 814, 816 are off, thus directing the current in a desired direction. With transistors 812, 818 on and transistors 814, 816 off, in a first half cycle, current flows in an upward direction in FIG. 8, and in a subsequent half cycle, with transistors 812, 818 off and transistors 814, 816 on, current flows in a downward direction. In this manner, a modulus x function is provided. Transistors 822, 824, respectively, provide a linear gain of α, where α is programmed by the current through transistor 830, and through variable resistors 826, 828.

The value of α will define the amount of compression or expansion of a waveform in order to provide a substantially sinusoidal waveform, compensating for asymmetry. Changing d and α changes the slopes and breakpoints, and provides a piece-wise linear approximation of a fairly precise magneto-resistive asymmetry.

As can be appreciated from the foregoing, according to the invention, using circuitry that is easily implementable and provides piece-wise linear functions, any desired asymmetry compensation of any order can be approximated within a desired range.

While the foregoing description has been provided with respect to one or more embodiments, various modifications within the scope and spirit of the invention will be apparent to those of working skill in the relevant technological field. Thus, the invention is to be limited by the scope of the following claims.

A non-transitory computer program product containing program code for performing a method for compensating for asymmetry in waveform of an input signal is also provided. The method includes outputting a first compensation as a first function and outputting a second compensation as a second function. The first and second compensations together provide a piecewise approximation to at least one region of a saturation curve.

What is claimed is:

1. A system comprising:
   a first circuit configured to (i) select a first portion of a signal based on a first offset, (ii) amplify the first portion of the signal according to a first function, and (iii) scale the amplified first portion based on a first factor to generate a first compensation for asymmetry in the first portion of the signal; and
   a second circuit configured to (i) select a second portion of the signal based on a second offset, (ii) amplify the second portion according to a second function, wherein the second function is different than the first function, and (iii) scale the amplified second portion based on a second factor to generate a second compensation for asymmetry in the second portion of the signal.

2. The system of claim 1, wherein the first circuit and the second circuit are connected in parallel.

3. The system of claim 1, wherein each of the first function and the second function is (i) a linear function of a form $\gamma=\alpha x$, (ii) an exponential function of a form $\gamma=\alpha e^x$, (iii) a modulus function of a form $\gamma=\beta x+\alpha|x|$, or (iv) a polynomial function of a form $$\sum_{i=0}^{n} \alpha i x^j.$$

4. The system of claim 1, wherein the first offset, the second offset, the first factor, and the second factor determine slopes and breakpoints of the first portion and the second portion of the signal.

5. The system of claim 1, wherein each of the first factor and the second factor determines an amount of compression or expansion of the signal to compensate for the asymmetry.

6. The system of claim 1, further comprising:
an amplifier configured to amplify the signal; and
a summer configured to generate a sum of (i) the amplified signal, (ii) the first compensation, and (iii) the second compensation.

7. The system of claim 6, wherein the first circuit, the second circuit, and the amplifier are connected in parallel.

8. A method comprising:
using a circuit,
selecting (i) a first portion of a signal based on a first offset and (ii) a second portion of the signal based on a second offset;
amplifying (i) the first portion of the signal according to a first function and (ii) the second portion according to a second function, wherein the second function is different than the first function; and
scaling (i) the amplified first portion based on a first factor to generate a first compensation for asymmetry in the first portion of the signal and (ii) the amplified second portion based on a second factor to generate a second compensation for asymmetry in the second portion of the signal.

9. The method of claim 8, wherein each of the first function and the second function is (i) a linear function of a form $\gamma=\alpha x$, (ii) an exponential function of a form $\gamma=\alpha e^x$, (iii) a modulus function of a form $\gamma=\beta x+\alpha|x|$, or (iv) a polynomial function of a form $$\sum_{i=0}^{n} \alpha i x^j.$$

10. The method of claim 8, wherein the first offset, the second offset, the first factor, and the second factor determine slopes and breakpoints of the first portion and the second portion of the signal.

11. The method of claim 8, wherein each of the first factor and the second factor determine an amount of compression or expansion of the signal to compensate for the asymmetry.

12. The method of claim 8, further comprising:
amplifying the signal; and
generating a sum of (i) the amplified signal, (ii) the first compensation, and (iii) the second compensation.

* * * * *